Sept. 21, 1926.
L. G. HAASE
1,600,761
METER BOX
Filed April 1, 1925
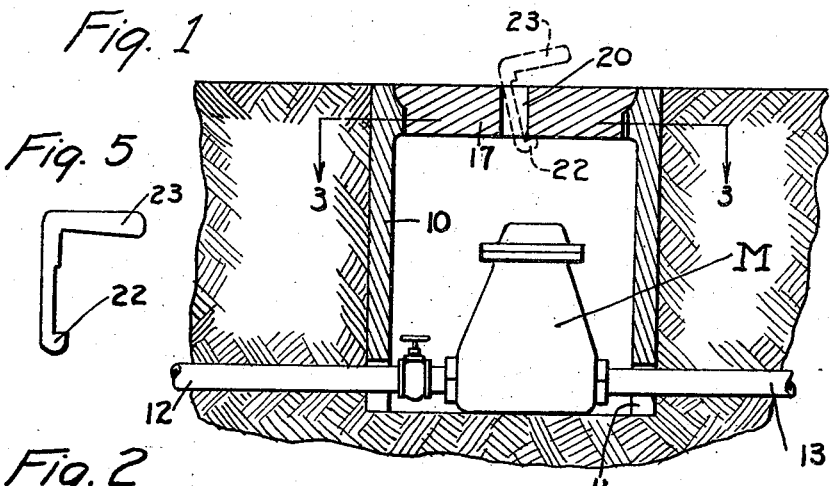
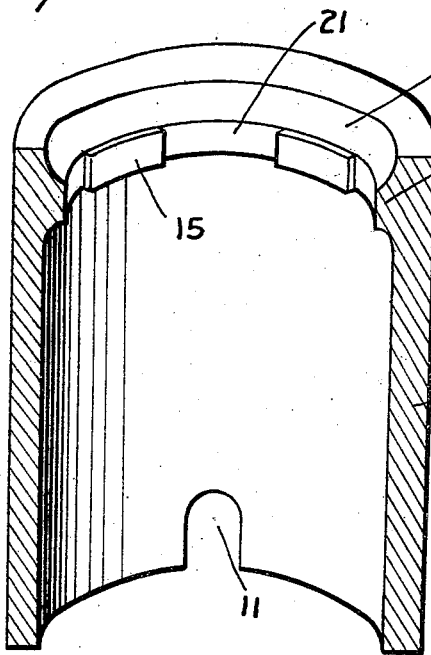
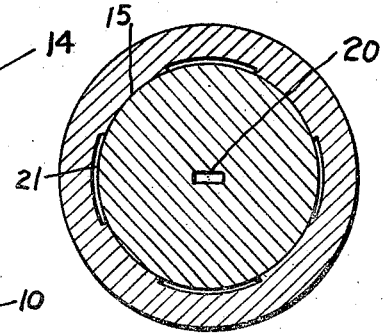
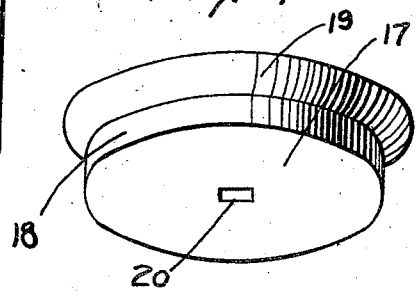
Inventor
Leo. G. Haase.
by: Hazard and Miller
Attys.

Patented Sept. 21, 1926.

1,600,761

UNITED STATES PATENT OFFICE.

LEO G. HAASE, OF LONG BEACH, CALIFORNIA.

METER BOX.

Application filed April 1, 1925. Serial No. 19,888.

This invention relates to improvements in meter boxes and may be considered as an improvement over the type of meter box disclosed in my prior Patent No. 1,087,366 issued February 17, 1914.

The object of this invention is to provide an improved meter box and cover therefor, which parts are so constructed as to permit the cover to be quickly and properly seated upon the meter box. It has been common experience that when the covers are placed upon the meter boxes, sand and dirt tends to fall between the seating surfaces upon the cover and upon the box. Because of this, the cover never properly seats upon the box and frequently the top surfaces of the cover project above the top of the meter box and in such instances, where the meter box is placed upon the sidewalk and in like locations, the cover projects slightly above the surface of the sidewalk so that pedestrians frequently stumble over the cover. By the improved construction an improved meter box and cover is provided, which is so constructed that the sand and dirt which tends to accumulate between the seating surfaces on the box and cover can readily be removed and caused to fall within the meter box.

With the foregoing and other objects in view which will be made manifest in the following detailed description and specifically pointed out in the appended claims, reference is had to the accompanying drawings for an illustrative embodiment of the invention, wherein:

Figure 1 is a vertical section through the improved meter box in applied position;

Fig. 2 is a vertical section showing the box in perspective;

Fig. 3 is a horizontal section taken substantially on the line 3—3 of Fig. 1;

Fig. 4 is a perspective view of the cover; and

Fig. 5 is a side elevation of the tool or key which is used for lifting the cover and for rotating it in causing the sand and dirt to be removed from between the seating surfaces.

Referring to the accompanying drawings wherein similar reference characters designate similar parts throughout, the box shown at 10 is preferably cylindrical in form, although it may have other shapes, if desired. At opposite sides of the box adjacent its bottom, recesses 11 are formed, permitting the inlet and outlet pipes 12 and 13 to extend into the box and to be connected to the meter M therein. Adjacent the top of the box 10 there is formed a flange 14, presenting interior cylindrical surfaces 15 and concave spherical seating surfaces 16 thereabove. The cover 17 has a lower cylindrical portion 18 which is adapted to be disposed between the cylindrical surfaces 15. Above the cylindrical portion 18, the cover presents convex seating surfaces 19, which seat upon the spherical seating surfaces 16 on the box. A rectangular aperture 20 is formed centrally of the cover. Although the box 10 is shown as being cylindrical in form, it may have other shapes, but it is essential that the flange 14 present interior cylindrical surfaces 15 and spherical seating surfaces 16 to accommodate a circular cover. Recesses 21 are formed in the flange 14 below the spherical seating surfaces 16.

The tool or key shown in Fig. 5 is preferably rectangular in cross section, and is capable of being inserted through the rectangular aperture 20. Its lower end is provided with a hook 22 adapted to engage the under side of the cover 17 in lifting the cover from the box to inspect the meter M. The key is shown as having a lateral handle 23.

The advantages of the improved construction are as follows: Because of the circular cover 17 and the box 10 having spherical seating surfaces, the cover can easily be rotated or twirled upon its seat. This movement which may be produced by rotation of the key tends to sweep off any sand or dirt which accumulates between the spherical seating surfaces on the box and cover and cause it to fall into the meter box. Such a removal of the sand and dirt will always cause the cover to properly seat upon the box so that the top surface of the cover will be flush with the top surface of the meter box. The recesses 21 in the box 10 cooperate with the cylindrical surfaces provided upon the cylindrical portion 18 of the cover 17 to form apertures through which the sand and dirt can readily drop into the interior of the box.

From the above construction it will readily be appreciated that the meter inspector after taking a reading of the meter can replace the cover 17 upon the box by means of the key and before withdrawing the key from within the aperture 20 he can twirl the cover by means of the key quite readily and thus insure the proper seating of the cover upon the meter box.

It will be understood that various changes in the detail of construction may be made without departing from the spirit or scope of the invention as defined by the appended claims:

I claim:

1. A meter box having a circular cover, there being complementary seating surfaces formed on the box and on the cover, the seating surfaces on the cover being curved transversely of its periphery, there being cylindrical surfaces provided on the box and on the cover below the seating surfaces adapted to contact and recesses formed on one of said cylindrical surfaces as and for the purpose described.

2. A meter box having a circular cover, there being complementary seating surfaces formed on the box and on the cover, the seating surfaces on the cover being curved transversely of its periphery, there being cylindrical surfaces provided on the box and on the cover below the seating surfaces adapted to contact and recesses formed on the cylindrical surfaces of the box as and for the purpose described.

3. A meter box having an inwardly extending flange providing interior cylindrical surfaces and seating surfaces thereabove, and a circular cover for the box having a cylindrical portion adapted to fit between the cylindrical surfaces on the box and having seating surfaces adapted to seat on the seating surfaces on the box, the seating surfaces on the cover being curved transversely of its periphery, there being recesses formed on the cylindrical surfaces of the box as and for the purpose described.

4. A meter box having an inwardly extending flange providing interior cylindrical surfaces and seating surfaces thereabove, and a circular cover for the box having a cylindrical portion adapted to fit between the cylindrical surfaces on the box and having seating surfaces adapted to seat on the seating surfaces on the box, the seating surfaces on the box being other than horizontal, and there being recesses formed on the cylindrical surfaces on the box as and for the purpose described.

In testimony whereof I have signed my name to this specification.

LEO G. HAASE.